M. CHAMPION.
Air-Brakes for Railroad-Cars.

No. 147,225. Patented Feb. 3, 1874.

WITNESS.

INVENTOR.

UNITED STATES PATENT OFFICE.

MATTHEW CHAMPION, OF CLEVELAND, OHIO.

IMPROVEMENT IN AIR-BRAKES FOR RAILROAD-CARS.

Specification forming part of Letters Patent No. 147,225, dated February 3, 1874; application filed September 2, 1872.

*To all whom it may concern:*

Be it known that I, MATTHEW CHAMPION, of Cleveland, county of Cuyahoga and State of Ohio, have invented an Improvement in Atmospheric Brakes for Railroad-Cars, of which the following is a specification:

My invention relates to improvements in air-brakes for railroad-cars, whereby the air, after having been forced by the air-pump into the air-drum, and thence to the brake-cylinders, (through the ordinary three-way cock now in general use,) for the purpose of "setting" the brakes of a train, may be instantaneously exhausted from the brake-cylinders by the air-pump in order to release the brakes; and it consists in combining, with the air-receiving pipe, an additional four-way cock, which controls the admission of air to the air-pump, and is also provided with nozzles, to which two additional pipes are connected, one of these pipes leading to the pipe which connects the air-drum with the brake-cylinders, while the other leads to and opens into the valve-cap of the air-pump.

But, that my invention may be fully understood, I will describe the same in detail by aid of the accompanying drawings.

Figure 1:
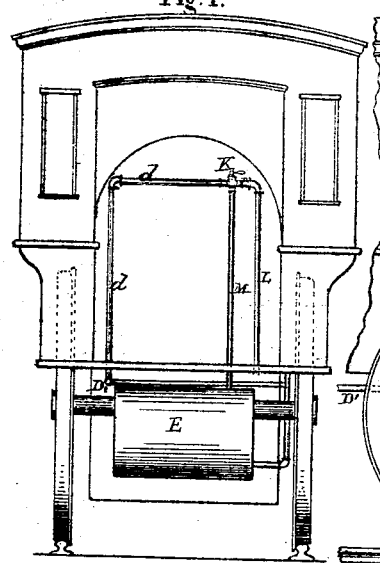
Figure 2:
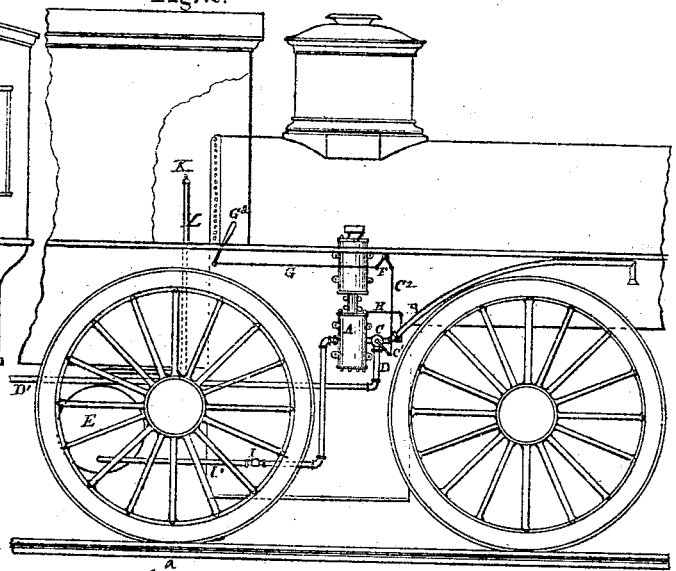
Figure 3:
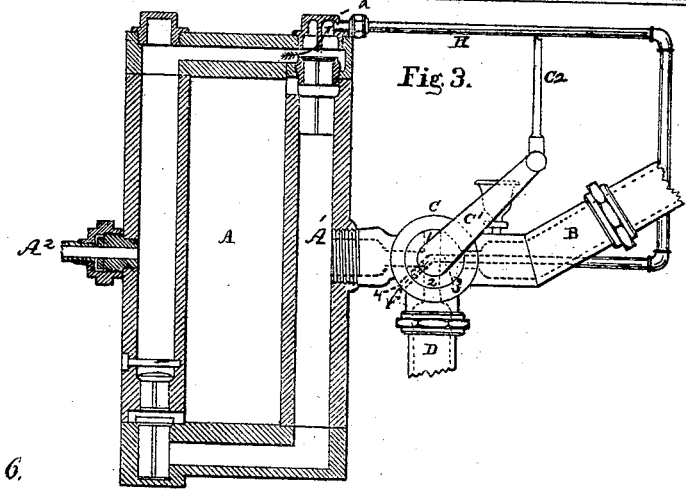
Figure 6:
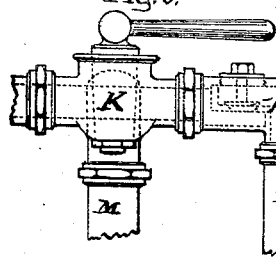
Figure 5:
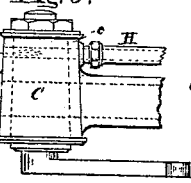
Figure 4:
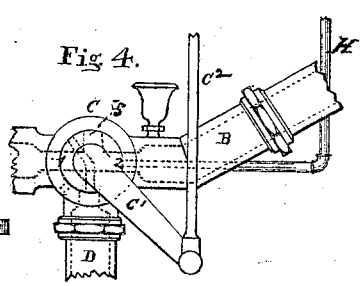

Figure 1 represents an end view, and Fig. 2 a portion of a side view, of a locomotive-engine with my improvements applied thereto. Fig. 3 is an enlarged sectional view of the air-pump cylinder and parts connected therewith. Figs. 4 and 5 are detached views of the four-way cock. Fig. 6 represents an enlarged view of the three-way cock separately.

A represents the air-pump cylinder, and B the air-receiving pipe, which is connected with the inlet-passage $A^1$ of the air-pump cylinder A by means of the four-way cock C, as hereinafter fully described. $A^2$ is the outlet-passage of the air-pump cylinder A, which is in direct communication with a pipe, I', by means of which the air drawn into the cylinder A by the pipe B is forced out into the air drum or receiver E. I is a check-valve affixed in the pipe I', for the purpose of preventing the return of air forced through the pipe I'. When it is desired to set the brakes, the three-way cock K is turned so as to connect the pipe M, from the drum or cylinder E, with the pipe $d$, the lower end of which is connected to the pipe D', leading to the brake-cylinders. L is the ordinary waste-pipe, placed by the side of the pipe M, which is furnished with a check-valve, N, hereinafter referred to. D is an additional pipe, one end of which is connected to one of the nozzles of the cock C, while its opposite end is in connection with the pipe D', leading to the brake-cylinders. H represents an exhaust-pipe, which, at one end, is connected to the nozzle $c^*$ of the cock C, the opposite end being connected to, and opening into, the valve-cap $a$ of the air-pump A.

The plug of the cock C is operated, when desired, by means of a lever, $C^1$, which is connected, by a rod, $C^2$, to a bell-crank lever, F, to which is connected one end of a rod, G, the opposite end of which is jointed to the lower end of a handle-lever, $G^2$.

The brakes of a train having been set by allowing a stream of air to pass from the drum E, by the pipes M $d$ D', to the brake-cylinders, and the train brought to a stand-still, when it is required to start the train the valve K is turned, so as to allow of the escape of the air from such cylinders by means of the pipes D', $d$, and L, as is well understood by persons acquainted with this class of brakes. At the same time the engineer in charge, by means of the lever $G^2$, operates the plug of the cock C to turn it from its normal position, as represented in Figs. 2 and 4, (with its passage 1 2 connecting the air-supply pipe B with the passage $A^1$ of the air-pump cylinder A,) into the position shown by Fig. 3, thereby closing the communication between the pipe B and the passage $A^1$, and connecting the pipe D therewith, whereby the air contained in the brake-cylinders will be exhausted by the air-pump A through the pipes D D' and forced through the exhaust-pipe H, which is regulated by the passage-way 3 of the cock C out through the opening 4 to the open air. When the air has been sufficiently exhausted from the brake-cylinders to slack off the brakes, the lever $C^1$ may be dropped half-way down, which closes the small exhaust-opening 4, and consequently shuts off the draft through the pipe H. At the same time the connection (by means of the passages 1 2) between the passage $A^1$ and the pipe D is partly closed, whereby the air will be forced into the air drum or receiver E. The exhaust of the cylinders having been thus completed, and the brakes moved off the wheels, the plug of the cock C is placed in its original position, as shown by Figs. 2 and 4, when the air-pump A will draw its supply of air from the pipe B, through the passages 2 1, and force the same into the drum or cylinder E, ready for further use.

The waste-pipe L is provided with a check-valve, N, in order to prevent the air-pump A from drawing air through the pipe L when exhausting the air from the brake-cylinders.

Having thus described my invention, I would have it understood that I lay no claim to the three-way cock K, the air-pump A, nor to any of the apparatus employed for setting the brakes of apparatus of this character; neither do I claim the employment of a four-way cock for the purpose of directing currents of air under pressure through tubes to the opposite sides of pistons for the purpose of exerting pressure on such pistons in opposite directions for the purpose of setting and forcing off the brakes of a train; nor do I claim, broadly, assisting the release of the brakes by means of an exhaust; but

What I do claim, and desire to secure by Letters Patent, is—

1. The combination, with air-brake apparatus provided with an air-pump, A, air-supply pipe B, pipes M, $d$, D′, and L, and a cock, K, of a four-way cock, for the purpose of shutting off the supply of air to the air-pump from the air-supply pipe, connecting the pump with the pipes connected directly with the cylinders which operate the brakes, and discharging the air from the pump, substantially as and for the purposes set forth.

2. The combination, with air-brake apparatus provided with an air-pump, A, air-supply pipe B, pipes M, $d$, D′, and L, and a cock, K, of a four-way cock, C, and pipes D and H, arranged and operating substantially as shown and described.

Witnesses:     MATT. CHAMPION.
  GEO. W. TIBBITTS,
  I. L. WOOD.